United States Patent
Boutaghou et al.

(10) Patent No.: US 6,687,088 B1
(45) Date of Patent: Feb. 3, 2004

(54) DISC DRIVE HEAD SLIDER WITH RECESSED LANDING PADS

(75) Inventors: Zine-Eddine Boutaghou, Vadnais Heights, MN (US); Peter Raymond Segar, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 710 days.

(21) Appl. No.: 09/100,698

(22) Filed: Jun. 19, 1998

Related U.S. Application Data

(60) Provisional application No. 60/050,346, filed on Jun. 20, 1997.

(51) Int. Cl.[7] .................... G11B 21/21; G11B 17/32; G11B 5/60
(52) U.S. Cl. .................. 360/234.3; 360/237.1; 360/236.5; 360/236.6; 360/235.9
(58) Field of Search ................ 360/103, 236.5, 360/236.6, 234.3, 237.1, 235.9

(56) References Cited

U.S. PATENT DOCUMENTS

| | | | |
|---|---|---|---|
| 4,605,977 A | * | 8/1986 | Matthews .............. 360/103 |
| 5,034,828 A | * | 7/1991 | Ananth et al. ............ 360/75 |
| 5,267,104 A | * | 11/1993 | Albrecht et al. ....... 360/97.02 |
| 5,285,337 A | * | 2/1994 | Best et al. ............ 360/97.02 |
| 5,508,861 A | * | 4/1996 | Ananth et al. ........... 360/103 |

FOREIGN PATENT DOCUMENTS

JP  4-341984  * 11/1992

* cited by examiner

*Primary Examiner*—William Klimowicz
(74) *Attorney, Agent, or Firm*—Westman, Champlin & Kelly, P.A.

(57) ABSTRACT

A slider body configuration, or slider, for carrying a data transducer in cooperative relationship with a rotating data storage disc. The slider includes a plurality of landing pads which serve to minimize the contact area between the slider and the discs when the heads are parked in contact with the discs, and the landing pads project from surfaces which are farther removed from the disc surface than the air bearing surfaces, thus minimizing the size and strength of any liquid miniscus formed between the slider and the disc when the slider and disc are in contact. By recessing the bases of the landing pads from the air bearing surfaces, the effect of the landing pads on the separation between the data transducer and the discs is minimized.

1 Claim, 5 Drawing Sheets

DISC DRIVE HEAD SLIDER WITH RECESSED LANDING PADS

CROSS REFERENCE TO RELATED APPLICATIONS

This application claims the benefit of U.S. Provisional Application No. 60/050,346, filed Jun. 20,1997.

FIELD OF THE INVENTION

This invention relates generally to the field of hard disc drive data storage devices, and more particularly, but not by way of limitation, to an improved slider body configuration for supporting a data transducer in cooperative relationship with a rotating data storage disc.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

When power to rotate the discs is lost; the hydrodynamic relationship between the heads and the discs rapidly deteriorates and the heads are no longer capable of flying above the disc surface in the intended manner. Similarly, a loss of power to the disc drive also terminates the ability of the disc drive to control the actuator which moves the heads across the discs. It is therefore common in the industry to move the actuator to a "park" location when a loss of power is detected and to latch the actuator at this park position until power is restored to the disc drive. This is done to prevent relative movement between the heads and discs when the heads and discs are in contact, since such relative motion could easily result in fatal damage to the heads, the discs or both.

While some disc drives of the current generation employ "parking ramps" located near the outer diameter of the discs to remove the heads from the discs and thus prevent head/disc contact during power-off conditions, the most common method of dealing with this situation is referred to as "contact start/stop",in which a specially designated area of the disc surfaces, usually located near the inner diameter of the discs, is set aside as a parking zone to which the heads are automatically moved at the detection of a power loss. The parking zone contains no recorded data, and, once the discs have slowed sufficiently that the heads lose their flying ability, the heads are brought to rest in contact with the disc surfaces and locked in this position until the restoration of power.

One difficulty with the contact start/stop type of disc drive occurs when the disc drive is repowered and tries to reestablish the air bearing between the heads and discs, and involves the phenomenon typically referred to in the industry as "stiction". Since the discs used in disc drives are typically coated with a lubricant to minimize damage to the heads or discs during incidental head/ disc contact, and since a small amount of water vapor within the disc drive housing is substantially unavoidable, a liquid miniscus forms between the head and disc when they are in contact. Because the air bearing surfaces of the heads are precision lapped to be as flat as possible, this liquid miniscus acts to bind the heads to the disc surfaces, creating stiction. This stiction must be overcome by the spindle motor in order to accelerate the discs and begin flying of the heads.

Many solutions to the problem of stiction have been proposed, including the intentional texturing of the disc surface at the parking zone, to minimize the contact area between the heads and discs and thus reduce the size and force of the liquid miniscus. It has also been suggested to include landing pads which protrude toward the disc above the air bearing surface, to prevent the full area of the air bearing surfaces from contacting the disc surface, thus also reducing the stiction phenomenon, but such designs have typically been undesireable compromises between stiction reduction and unwanted increased separation of the data transducer from the disc. Such increased separation of the transducer from the disc lowers the available data resolution, and thus limits the data density which can be provided, leading to lowered capacity of the disc drive.

It would be desireable, therefore, to provide an apparatus that reduces stiction while optimizing the flying relationship between the data transducer and the disc.

SUMMARY OF THE INVENTION

The present invention is a slider body configuration, or slider, for carrying a data transducer in cooperative relationship with a rotating data storage disc. The slider includes a plurality of landing pads which serve to minimize the contact area between the slider and the discs when the heads are parked in contact with the discs, and the landing pads project from surfaces which are farther removed from the disc surface than the air bearing surfaces, thus minimizing the size and strength of any liquid miniscus formed between the slider and the disc when the slider and disc are in contact. By recessing the bases of the landing pads from the air bearing surfaces, the effect of the landing pads on the separation between the data transducer and the discs is minimized.

It is an object of the invention to provide a slider body configuration for mounting and carrying a data transducer in cooperative relationship with a rotating data storage disc.

It is another object of the invention to provide a slider body configuration that reduces the liquid miniscus between the slider and the disc when the slider and the disc are in contact.

It is another object of the invention to provide a slider body configuration that optimizes the spatial relationship between the data transducer and the disc.

It is another object of the invention to provide a slider body configuration that is simple and ecomical to manufacture.

The manner in which the present invention achieves these objects, as well as other features and benefits of the invention, can best be understood by a review of the following Detailed Description of the Invention, when read in conjunction with an examination of the accompanying drawings.

BRIEF DESCRIPTION OF THE DRAWINGS

FIGS. 2-1 and 2-2 are elevation and plan views, respectively, of a typical prior art head slider assembly.

FIGS. 3-1 and 3-2 are elevation and plan views, respectively, of a prior art head slider assembly which has been modified to include landing pads.

FIGS. 4-1 and 4-2 are detail diagrammatic views showing the effect of landing pad height on the phenomenon of stiction in the prior art slider configuration of FIGS. 3-1 and 3-2.

FIG. 4-3 is a detail diagrammatic view showing the effect of the present invention.

FIGS. 5-1 and 5-2 are elevation and plan views, respectively, of a slider body configuration manufactured in accordance with the present invention.

DETAILED DESCRIPTION OF THE INVENTION

Figure 1:
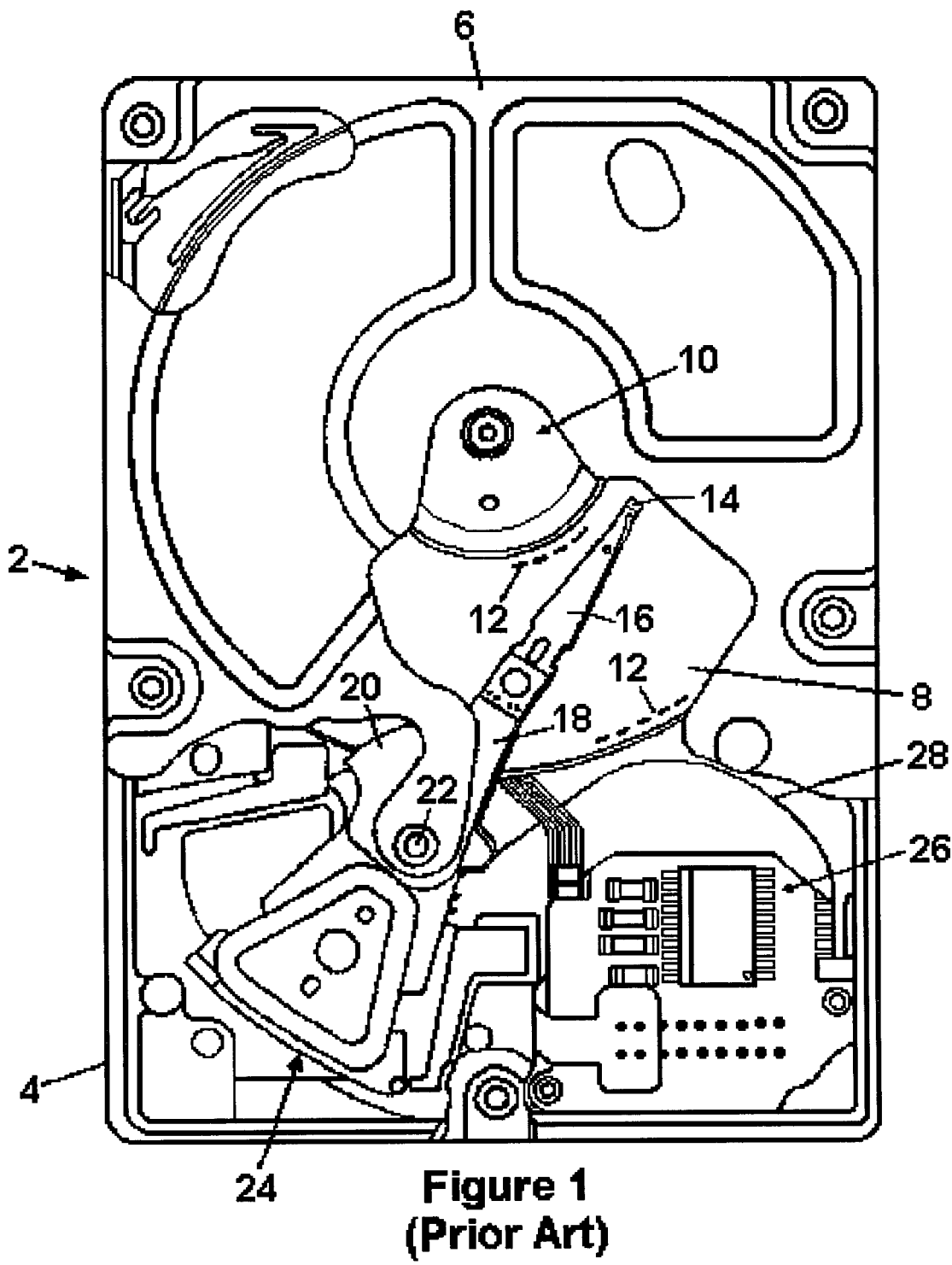
FIG. 1 is a plan view of a prior art disc drive in which the present invention is particularly useful.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. Electronic circuitry (partially shown at 26, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 28.

It is well known to those of skill in the art that the head assembly 14 is comprised of a slider body, or slider, (not separately designated) which carries a data transducer (also not separately designated), and that the slider is configured with an arrangement of air bearing surfaces that interact with a thin layer of air dragged along by the rotating discs 8 to fly the data transducer at a designed flying height above the disc surface. The air bearing surfaces, as well as the data transducer, have assumed many forms and have been of many different types.

Figures 1, 2:
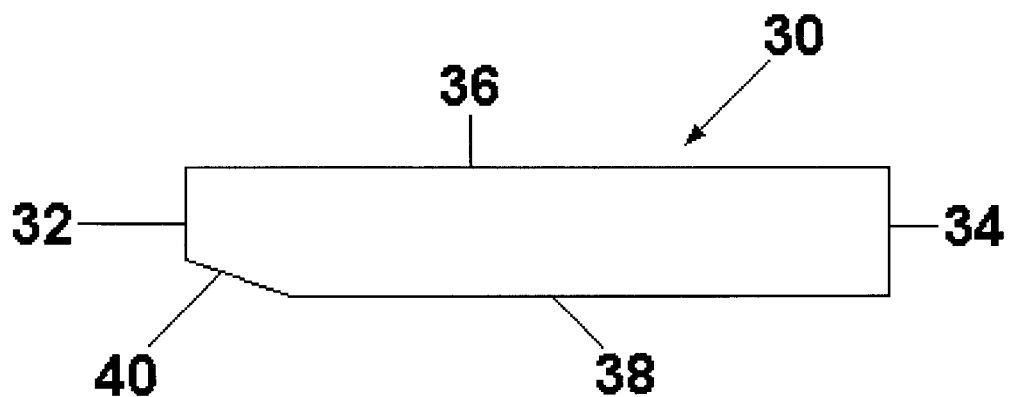
Figure 2:
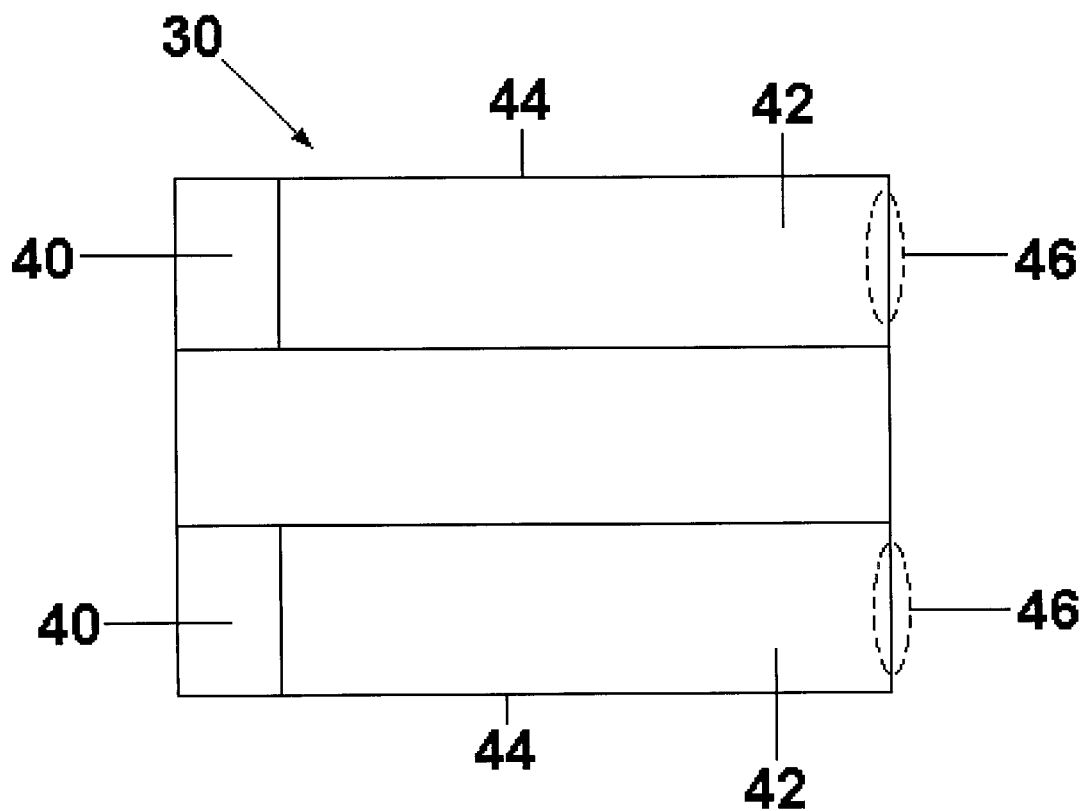

Turning now to FIGS. 2-1 and 2-2, shown are elevation and plan views, respectively, of a typical prior art slider 30. FIGS. 2-1 and 2-2 are useful for a discussion of the general elements common to disc drive head sliders, as well as for facilitating the definition of certain directional references which will be used throughout the ensuing discussion.

In FIGS. 2-1 and 2-2, the slider 30 can be seen to include a leading edge 32 and a trailing edge 34, which are the first and final portions, respectively, of the slider under which any given point of the disc will pass as the disc rotates under the head.

The slider 30 also includes an upper surface 36 to which the head suspension (16 in FIG. 1) is attached, and, on the side opposite the upper surface 36, an air bearing surface 38. FIG. 2-1 shows that the slider 30 also has a beveled surface 40 adjacent the leading edge 32 which serves to compress the air above the rotating disc surface and aid in the establishing of the air bearing that separates the slider 30 from the disc during operation.

As can be seen in FIG. 2-2, the air bearing surface 38 is actually made up of a pair of side rails 42 located along the lateral edges 44 of the slider 30. This "two-rail" configuration is for this reason sometimes referred to in the industry as a "catamaran slider". The data transducers used to record and recover data on the discs are commonly carried on the slider 30 at the trailing edges of the side rails 42 in the general areas shown by dotted lines at 46.

Since disc drives typically include head assemblies associated with both surfaces of the discs, directional definitions can become ambiguous. Therefore, for purposes of this disclosure, the upper surface 36 of the slider 30 will always be defined as that surface farthest from the disc surface, with other directional notations, such as "upward","downward", "top","bottom" and the like also defined in reference to the disc surface.

From FIG. 2-2, it is apparent that the side rails 42 that make up the air bearing surface 38 of the slider 30 comprise a major portion of the plan area of the slider 30. If the entire area of the side rails 42 were to be brought into direct contact with the disc surface, a liquid miniscus formed at the contact plane would exert a relatively large force holding the slider 30 to the disc. Therefore, several attempts have been made in the industry to minimize the actual contact area between the slider 30 and the disc.

Figures 1, 3:
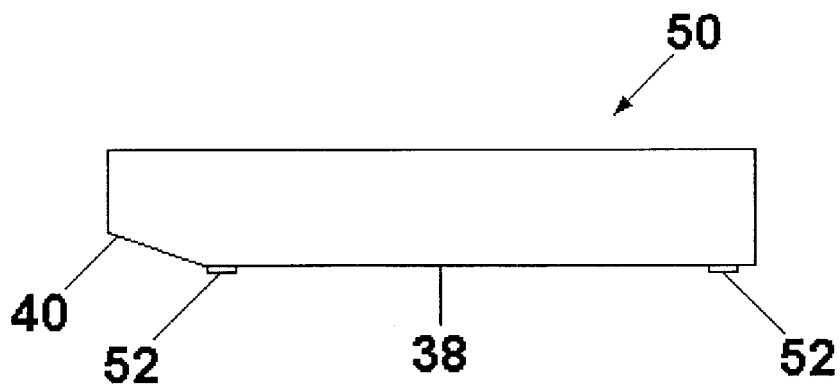
Figures 2, 3:
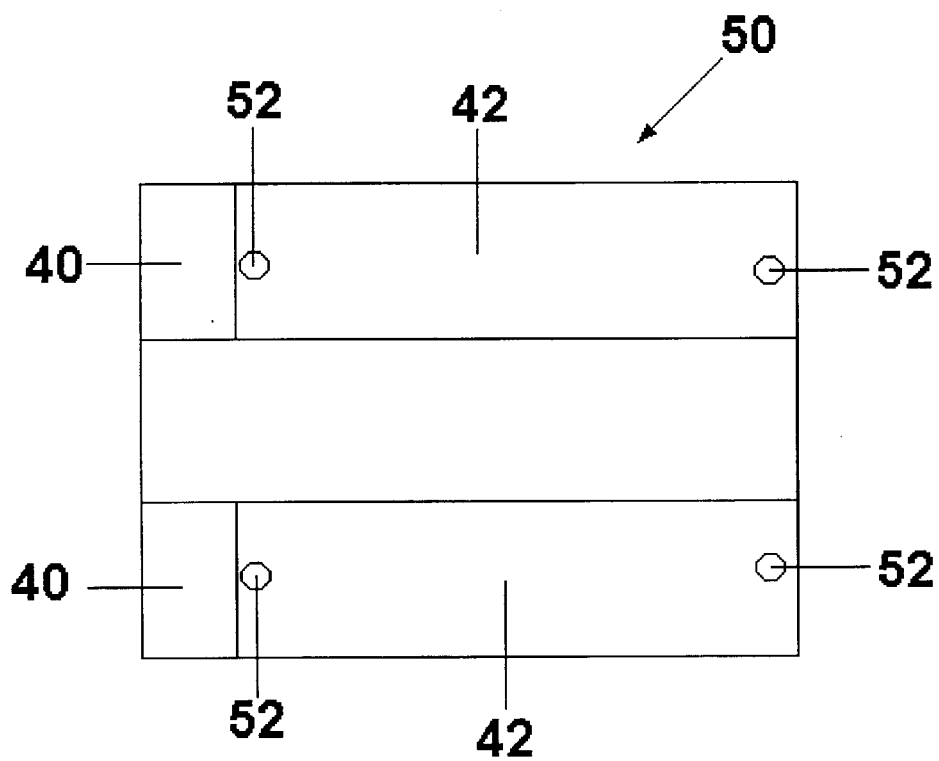

FIGS. 3-1 and 3-2 are elevation and plan views, respectively, of a slider 50, similar to that of FIGS. 2-1 and 2-2, that has been modified through the inclusion of a plurality of landing pads 52. From FIG. 3-1 it is evident that the landing pads project downward (toward the disc) further than the majority of the side rails 42 forming the air bearing surface of the slider 50. Thus the actual contact area between the slider 50 and the disc has been decreased from the entire surface area of the side rails 42 to only the surface areas of the landing pads 52. This reduction in actual contact area does provide a reduction in the stiction force holding the slider 50 to the disc. However, it has been found that other considerations must be made to optimize the slider design.

For instance, in order to improve the tribological characteristics of landing pad sliders, it is desirable to reduce the take-off velocity of the slider by locating the landing pads toward the leading edge of the slider. However to provide maximum stability to the slider during normal operation, it is desirable to locate the trailing landing pads close to the trailing edge of the slider. Placing the trailing landing pads near the trailing edge of the slider places limits on the height of the landing pads relative to the air bearing surface 38 due to attitude changes that the slider goes through during take-off, and it has been experimentally observed that the height of the landing pads was an important factor in controlling stiction, as will be discussed in detail below. Thus the designer of a landing pad slider is faced with the contradictory requirements that the trailing landing pads be close to the trailing edge, where they need to have a low variance from the air bearing surface to prevent damaging contact between the slider and the disc during take-off, and where they need to have a large displacement from the air bearing surfaces to minimize stiction.

Figures 1, 4:
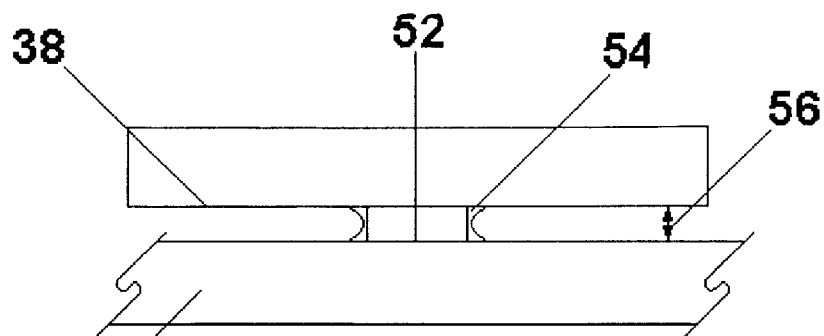
Figures 2, 4:
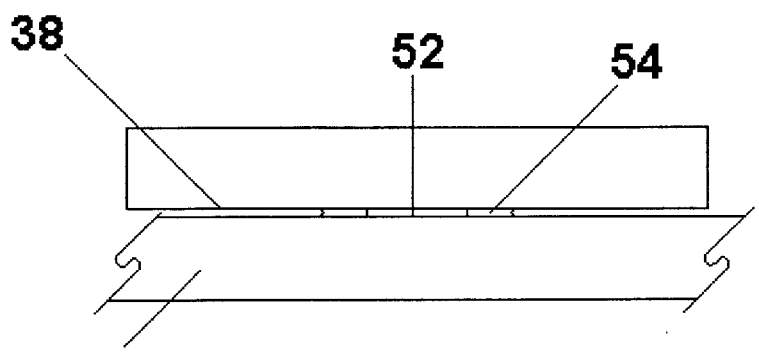
Figures 3, 4:
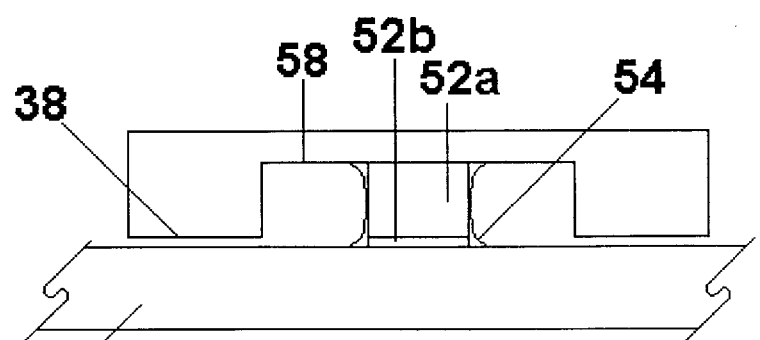

The manner in which the relative vertical position of the landing pads and air bearing surfaces effects stiction can best be seen in FIGS. 4-1 and 4-2.

FIGS. 4-1 and 4-2 are simple diagrammatic views showing a disc 8 and portions of a slider that includes landing pads 52 projecting from the slider air bearing surface 38. A comparison between FIG. 4-1 and FIG. 4-2 reveals that in FIG. 4-1 the landing pad 52 projects below the air bearing surface 38 to a greater extent than does the landing pad 52 in FIG. 4-2. It has been found that the size of the liquid miniscus 54 between the landing pad 52 and the disc 8 varies inversely with the height of the landing pad 52 below the air bearing surface 38. That is, when the height of the landing pad 52 is greater, the size—and thus the strength—of the liquid miniscus 54 is minimal as seen in FIG. 4-1, but when the height of the landing pad 52 is reduced, the size—and therefore the strength—of the liquid miniscus 54 increases, in turn raising the stiction force between the slider and the disc 8. Looking at this aspect of the slider design alone, it would appear that one would simply have to increase the landing pad height to minimize stiction.

However, it must be recalled that the slider is also used to carry the data transducer above the disc 8, and the data transducer is typically located on the trailing edge of the air bearing surface, as noted above in the discussion of FIGS. 2-1 and 2-2. This means that there is a finite limit to the height of the landing pad 52 from the air bearing surface 38, since increasing the height of the landing pad 52 also increases the spacing 56 between the air bearing surface 38—and thus the data transducer—and the disc 8.

FIG. 4-3 is a simple diagrammatic view showing how the present invention operates to overcome these seemingly mutually exclusive design considerations. The figure shows that the landing pad is actually formed in two parts: a main post portion 52a, which is integral to the slider body; and a wear coating 52b, which is deposited on the end of the main post portion 52a after the air bearing surfaces 38 and the main post portion 52a have been lapped to their desired dimensions and precision. The wear coating 52b is presently envisioned to be diamond-like carbon (DLC) for tribological considerations. Furthermore, it is envisioned by the invention that the thickness of the wear coating 52b will be only on the order of one tenth of the height of the main post portion 52a. For instance, the wear coating 52b can be 0.04 microinches thick, while the height of the main post portion can be 0.4 microinches tall. Since the thickness of the wear coating 52b establishes the separation between the ABS 38 and the surface of the disc 8 when the head and disc are in contact, and the height of the post portion 52a is ten times greater still, the radius of the liquid miniscus 54 will be greatly changed. In FIG. 4-3 it can be seen that the height of the landing pad 52a/52b has been optimized to reduce the size of the liquid miniscus 54, while the spacing of the air bearing surface 38 from the disc 8 has been kept to a minimum. This is accomplished by placing the landing pad 52a/52b in a recess 58 which extends upward higher than the surrounding air bearing surface 38. Since the landing pad 52a/52b extends from a surface 58 other than the air bearing surface 38, the height of the landing pad 52a/52b can be optimized to reduce the liquid miniscus 54, while still optimizing the relative position of the air bearing surface 38 to the disc 8. Since the size of the liquid miniscus 54 is no longer directly associated with the vertical position of the air bearing surface 38 relative to the surface of the landing pad 52a/52b, a design which minimizes stiction while maintaining the desired relationship between transducer and disc 8 can be achieved.

Figures 1, 5:
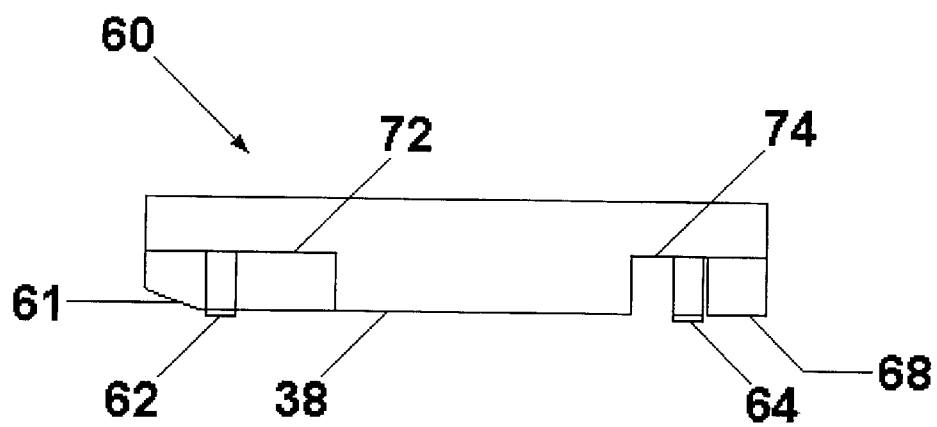
Figures 2, 5:
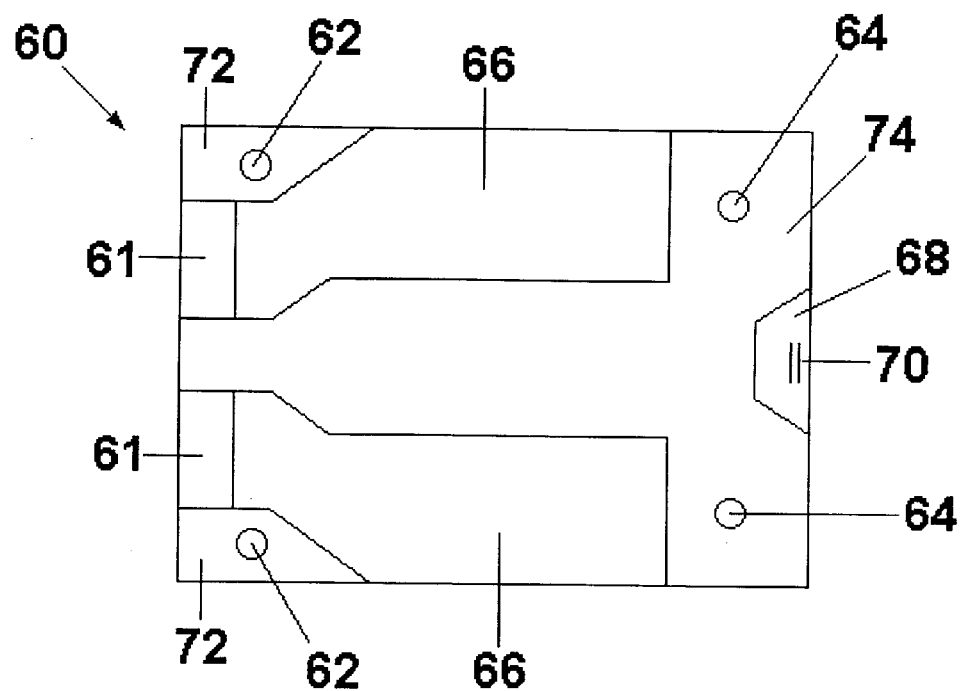

Turning now to FIGS. 5-1 and 5-2, shown are simple elevation and plan views, respectively of a slider 60 made in accordance with the present invention. The slider 60 is of the type referred to in the art as a "tri-pad" slider, since it includes an air bearing surface made up of a pair of lateral side rails 66 and a transducer pad 68 which mounts the data transducer, shown generally at 70. It should be noted here that the present invention can be as readily implemented in other types of slider bodies, such as negative pressure sliders, and as such the scope of the present invention is not envisioned as being limited by the specific configuration of air bearing surface implemented in the slider.

The figures also show that the slider includes a pair of leading landing pads 62 and a pair of trailing landing pads 64, and that these landing pads are located in recessed areas 72 and 74, respectively, which are positioned at a height above the air bearing surfaces 66, 68. Thus the height of the landing pads 62, 64 can be selected independently from the relative vertical location of the air bearing surfaces and the surfaces of the landing pads. Furthermore, it will be apparent to one of skill in the art that height of the leading landing pads 62 can be selected independent of the height of the trailing landing pads 64, since the recessed areas 72, 74 can be designed to have different heights above the disc surface and/or the surfaces of the landing pads 62, 64.

It will also be apparent to one of skill in the art that the location of the landing pads 62, 64 can be freely modified relative to a bevel 61 on the leading edge of the slider 60 and the trailing edge of the slider, since the location of the landing pads 62, 64 is independent from the air bearing surfaces of the slider.

Fabrication of a slider in accordance with the present invention is readily achieved through any of a number of manufacturing processes. For instance, the air bearing surfaces and landing pads of the slider can all be ion milled from a single piece of monolithic material. The height of the landing pads could then be optimized by applying an appropriate thickness of a wear resistant material, such as diamond-like carbon (DLC). Alternatively, a layer of DLC could be deposited on the lower surface of the slider prior to the forming of the landing pads and air bearing surface, and then those features could be formed by appropriate masking and etching or again by ion milling, or a combination of these techniques.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. A disc drive, comprising:
   a slider supportable over a rotatable disc; and
   stiction reduction means for reducing stiction between the slider and the rotatable disc.

* * * * *